United States Patent [19]

Ichikawa et al.

[11] Patent Number: 5,800,190
[45] Date of Patent: Sep. 1, 1998

[54] RELAY DEVICE FOR ROTATING MEMBERS

[75] Inventors: Hidehiro Ichikawa; Satoshi Ishikawa; Hiroaki Iizuka; Takeshi Sakakibara; Nobuhiko Suzuki; Hiraku Tanaka, all of Shizuoka-ken, Japan

[73] Assignee: Yazaki Corporation, Tokyo, Japan

[21] Appl. No.: 705,841

[22] Filed: Aug. 30, 1996

[30] Foreign Application Priority Data

Sep. 1, 1995 [JP] Japan .................................. 7-225426

[51] Int. Cl.$^6$ ................................................ H01R 35/04
[52] U.S. Cl. ................................... 439/164; 439/15
[58] Field of Search .................................. 439/164, 15

[56] References Cited

U.S. PATENT DOCUMENTS

| 5,224,871 | 7/1993 | Ida et al. ................. 439/164 |
| 5,409,389 | 4/1995 | Shibata et al. ............ 439/164 |

FOREIGN PATENT DOCUMENTS 4-333473   11/1992   Japan .
5-53183    7/1993    Japan .

*Primary Examiner*—Neil Abrams
*Assistant Examiner*—Tho Dac Ta
*Attorney, Agent, or Firm*—Finnegan, Henderson, Farabow, Garrett & Dunner, L.L.P.

[57] ABSTRACT

A relay device includes a first rotor having an inner cylinder, a second rotor having an outer cylinder, a flexible flat cable wound spirally in an annular space defined between the inner cylinder and the outer cylinder and a C-shaped moving member arranged so as to move along the annular space. The C-shaped moving member consists of an inner horizontal rib, an outer horizontal rib, an upper vertical rib and a lower vertical rib. When the flexible flat cable is rewound from the inner cylinder by the relative rotation between the inner cylinder and the outer cylinder, the contact area of the moving member with the cable can be reduced because the inner horizontal rib is in the form of a plate material projecting from the inner peripheral face of the moving member horizontally. Thus, it is possible to reduce the frictional force of the moving member on the cable and to prevent the cable from buckling.

9 Claims, 10 Drawing Sheets

RELAY DEVICE FOR ROTATING MEMBERS

BACKGROUND OF THE INVENTION

1. Field of the Invention

The present invention relates to a relay device for accomplishing an electrical connection between relatively rotating members through the intermediary of a flexible flat cable.

2. Description of the Related Art

Hitherto, this kind of relay device includes a first rotor having an inner cylinder, a second rotor having an outer cylinder surrounding the inner cylinder of the first rotor at a designated distance, a flexible flat cable wound spirally in an annular space defined between the inner cylinder and the outer cylinder and a C-shaped moving member arranged so as to move along the annular space and provided with an opening (gap) where the cable is turned over.

The cable has an inner peripheral end carried by the inner cylinder and an outer peripheral end carried by the outer cylinder. The moving member has a plurality of projections formed on respective inner and outer peripheral faces thereof at intervals so as to extend in the axial direction. These projections are provided for reducing a frictional resistance between the cable and the moving member, thereby operating as lubricating members.

In the relay device mentioned above, when the inner cylinder rotates relative to the outer cylinder in one direction, the flexible flat cable is driven so as to wind round the inner cylinder. Then, the cable outside the moving member firstly abuts on the outer peripheral face of the moving member. Thereafter, abutting on one opening end of the gap, the cable turns over and enters into an inside of the moving member so as to wind round the inner cylinder. During this movement, the moving member rotates in the opposite direction since the other opening end of the gap is urged by the cable.

To the contrary, when the inner cylinder rotates relative to the outer cylinder in the opposite direction, the flexible flat cable on the inner cylinder is wound back and displaced around the inner cylinder. Consequently, the cable is brought into contact with the inner peripheral face of the moving member. Thereafter, abutting on the other opening end of the gap, the cable turns over and moves to the outside of the moving member so as to abut on the inner peripheral face of the outer cylinder.

In the above-mentioned relay device, however, since the projections on the moving member are formed so as to extend over the whole width of the cable, the most part of the cable in the direction of width comes into contact with the projections frictionally. Thus, in spite of the projections, the contact area between the cable and the moving member cannot be decreased substantially, so that the frictional force therebetween is not reduced, too.

Therefore, when the cable is wound back by the rotating inner cylinder, the cable moving to the outside of the moving member is subjected to large dynamic resistance from the inner face of the moving member. Consequently, due to hardness for the cable to go out through opening of the movable member, the buckling would be caused since another part of the cable besides a normal part also projects through the gap. Such a buckling would cause the cable's life span to be shortened, so that it has to prevent the occurrence of the buckling.

SUMMARY OF THE INVENTION

It is therefore an object of the present invention to provide a relay device which is capable of preventing the flexible flat cable from buckling by reducing the frictional force between the flexible flat cable and the moving member.

The object of the present invention described above can be accomplished by a relay device comprising:

a first rotor having an inner cylinder;

a second rotor having an outer cylinder surrounding the inner cylinder of the first rotor at a designated distance, the outer cylinder rotating with respect to the inner cylinder relatively;

a flexible flat cable wound spirally in an annular space defined between the inner cylinder and the outer cylinder, the flexible flat cable having an inner peripheral end carried by the inner cylinder and an outer peripheral end carried by the outer cylinder; and a C-shaped moving member arranged so as to move along the annular space, the C-shaped moving member having a gap where the flexible flat cable is turning over;

wherein the C-shaped moving member comprises an inner horizontal rib in the form of a plate projecting from an inner peripheral face of the C-shaped moving member horizontally, and an outer horizontal rib in the form of a plate projecting from an outer peripheral face of the C-shaped moving member horizontally.

In the so-constructed relay device, for example, when the flexible flat cable is rewound from the inner cylinder by the relative rotation between the inner cylinder and the outer cylinder, the cable firstly abuts on the inner horizontal rib of the moving member and thereafter, moves to the outside of the moving member while turning over at the gap. As for this movement of the cable, since the inner horizontal rib is constituted by a plate material projecting from the inner peripheral face of the moving member horizontally, the contact area of the moving member with the cable can be reduced remarkably. Therefore, since it is possible to reduce the frictional force of the moving member applied on the cable, such a reduction allows the cable to be displaced from the inside of the moving member to the outside smoothly, so that it is possible to prevent the cable from buckling.

To the contrary, when the flexible flat cable is wound round the inner cylinder by the relative rotation between the inner cylinder and the outer cylinder, the cable moves to the inside of the moving member through the gap while coming in contact with the outer horizontal rib of the moving member. Also in this case, since the contact area of the outer horizontal rib of the moving member with the cable can be reduced remarkably, it is possible to reduce the frictional force of the moving member applied on the cable. Therefore, such a reduction allows the cable to be displaced from the outside of the moving member to the inside smoothly, so that it is possible to prevent the cable from buckling.

In the present invention, preferably, the above relay device further comprises a top cover for covering an upside of the annular space and an under cover for covering an underside of the annular space and the C-shaped moving member further comprises an upper vertical rib in the form of a plate projecting upwardly to abut on the top cover, and a lower vertical rib in the form of a plate projecting downwardly to abut on the under cover.

In this relay device where the moving member includes the plate-shaped upper vertical rib abutting on the top cover and the plate-shaped lower vertical rib abutting on the under cover, with the reduction in contact area between the moving member and both covers, the frictional force between the moving member and the covers can be reduced respectively. Consequently, it make the moving member possible to move in the annular space smoothly. Thus, since the flexible flat cable also moves smoothly, it is possible to prevent the cable from buckling. Furthermore, since the moving member comes in contact with the upper and under covers, it is possible to prevent the occurrence of rattling and noise of the moving member caused by the vibrations in the upward and downward directions.

More preferably, the C-shaped moving member has a cross-shaped section composed of the inner horizontal rib, the outer horizontal rib, the upper vertical rib and the lower vertical rib.

In this case, since not only frictional force between the moving member and the flexible flat cable but frictional force between the moving member and the upper and under covers can be reduced, it facilitates the movement of the cable remarkably, so that it is possible to prevent the cable from buckling certainly.

Alternatively, the inner horizontal rib and the outer horizontal rib may be formed to have predetermined lengths respectively, and arranged so as to deviate from each other up and down.

In this case, since the flexible flat cable is maintained parallel to either peripheral face of the moving member, it is possible to facilitate the movement of the flexible flat cable further.

In the present invention, the inner horizontal rib and the outer horizontal rib may be composed of a plurality of members projecting in the form of circular plates.

In this case, since the flexible flat cable is brought into contact with a top of the circular plate, it is possible to further reduce the contact area between the moving member and the flexible flat cable. Thus, since the dynamic resistance of the cable decreased furthermore, it is possible to prevent the cable from buckling and to reduce noise in sliding between the moving member and the flexible flat cable.

In the present invention, the upper vertical rib and the lower vertical rib may be composed of a plurality of members projecting in the form of circular plates.

In this case, since the tops of the circular plates are brought into contact with the top and under covers, it is possible to further reduce the contact area between the moving member and the covers. Consequently, since the moving member moves more smoothly, the flexible flat cable also moves smoothly, so that it is possible to prevent the cable from buckling. Furthermore, since the dynamic resistance of the moving member decreased furthermore, it is possible to reduce noise in sliding between the moving member and both covers.

Alternatively, the inner horizontal rib and the outer horizontal rib may be composed of a plurality of members projecting in arcs.

With the arrangement, the inner horizontal rib and the outer horizontal rib bend elastically by the abutments on the flexible flat cable. Thus, the inner horizontal rib and the outer horizontal rib allow the flexible flat cable to be urged against the inner and outer cylinders elastically and to be held thereon. Therefore, it is possible to prevent the flexible flat cable from fluttering and buckling. Moreover, as the flexible cable abuts on the respective arcs at the tops, the contact area between the moving member and the cable can be decreased, thereby lightening the dynamic resistance of the cable while reducing the sliding noise generated between the moving member and the cable. Further, since the space between the inner cylinder and the outer cylinder is increased because of the reduction in area of the horizontal ribs, the moving member is so lightened that the dynamic resistance can be further decreased conveniently.

Alternatively, the upper vertical rib and the lower vertical rib may be composed of a plurality of members projecting in arcs.

Also in this case, the moving member can be brought into contact with the top and under covers with appropriate elastic forces. Therefore, it is possible to restrict the frictional forces between the moving member and the top and under covers to a minimum and prevent the flexible flat cable from fluttering certainly. In addition, since the members abut on the top and under covers at respective tops of the arcs, the contact area between the moving member and the covers is decreased. Thus, owing to reduction in dynamic resistance of the moving member, it is possible to reduce the dynamic resistance of the flexible flat cable, thereby preventing the flexible flat cable from buckling and reducing sliding noise generated between the moving member and the covers. Further, since the space between the top cover and the under cover is increased because of the arc formation of both vertical ribs, the moving member is so lightened to reduce the dynamic resistance of the moving member.

In the modification, the inner horizontal rib and the outer horizontal rib may include elastic deformable members, respectively.

In such a case, owing to proper deformation of the elastic deformable members, the inner and outer horizontal ribs enable the flexible flat cable to be urged against the inner and outer cylinders with appropriate forces and to be held thereon. Therefore, it is possible to prevent the flexible flat cable from fluttering and buckling.

Alternatively, the upper vertical rib and the lower vertical rib may include elastic deformable members, respectively.

Also in this case, since the arrangement allows the moving member to abut on the top and under covers with appropriate elastic forces, it is possible to reduce the frictional force between the moving member and the covers to a minimum and prevent the moving member from fluttering.

These and other objects and features of the present invention will become more fully apparent from the following description and appended claims taken in conjunction with the accompany drawing.

DESCRIPTION OF THE PREFERRED EMBODIMENTS

A variety of embodiments of the present invention will be described with reference to FIGS. 1 to 23. First of all, we now describe the first embodiment of the present invention with reference to FIGS. 1 to 3.

Figure 3:
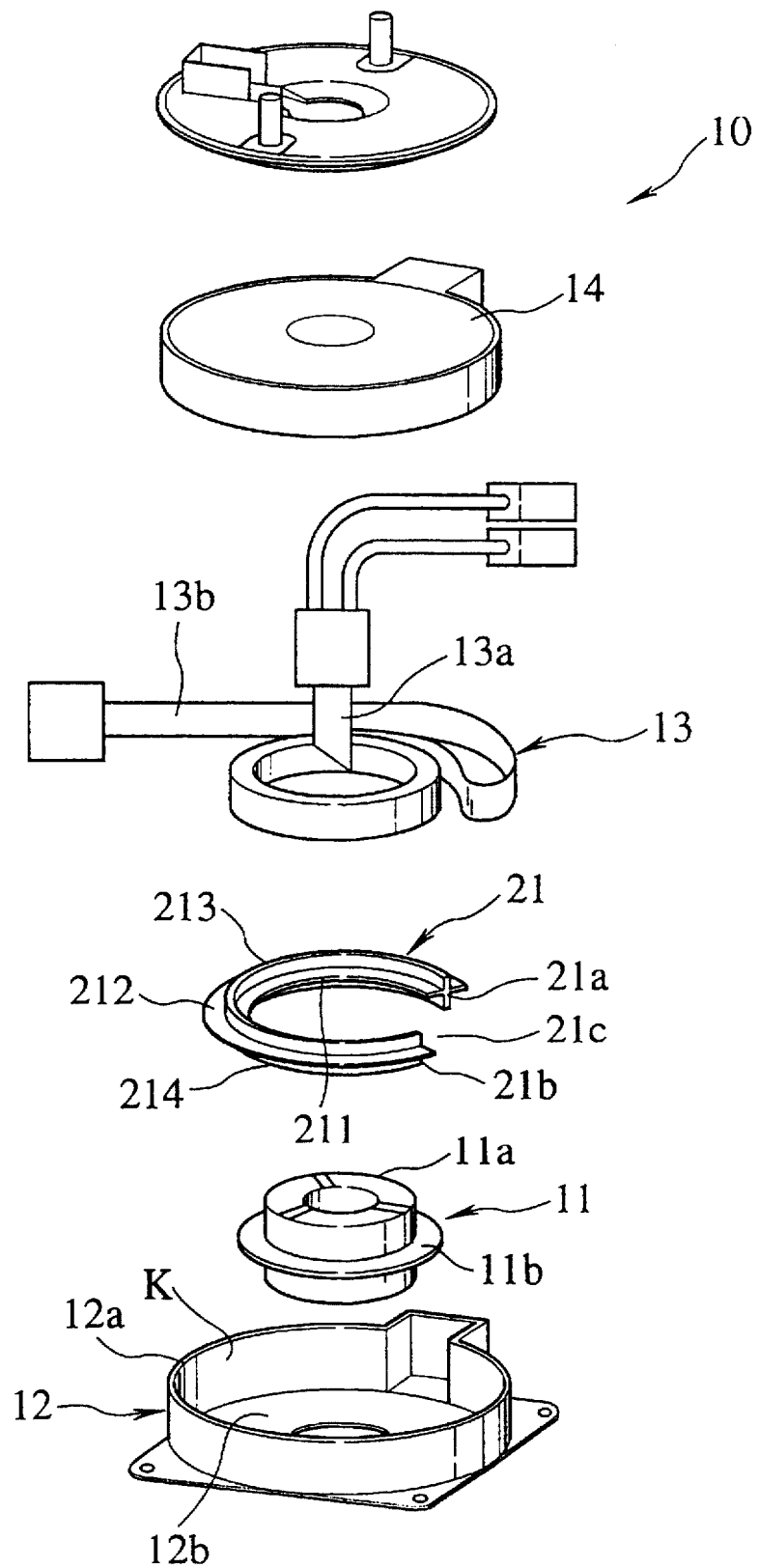
FIG. 3 is a disassembled perspective view of the relay device of FIG. 1.

As shown in FIG. 3, a relay device 10 includes a rotor (a first rotor) 11 having an inner cylinder 11a and a stator (a second rotor) 12 having an outer cylinder 12a surrounding the inner cylinder 11a at a designated distance. The relay device 10 further includes a flexible flat cable 13, an annular top cover 14 and a C-shaped moving member 21. The flexible flat cable 13 is accommodated in an annular space K defined between the inner cylinder 11a and the outer cylinder 12a and wound in the space K spirally. The cable 13 has an inner peripheral end 13a carried by the inner cylinder 11a and an outer peripheral end 13b carried by the outer cylinder 12a. The C-shaped moving member 21 is arranged so as to move along the annular space K and provided with an opening (gap) 21c where the cable 13 is turned over.

Above the inner cylinder 11a, the top cover 14 is arranged for covering an upside opening of the space K. While, an under cover 12b is formed in integral with the outer cylinder 12a to cover an underside of the space K.

Figure 1:
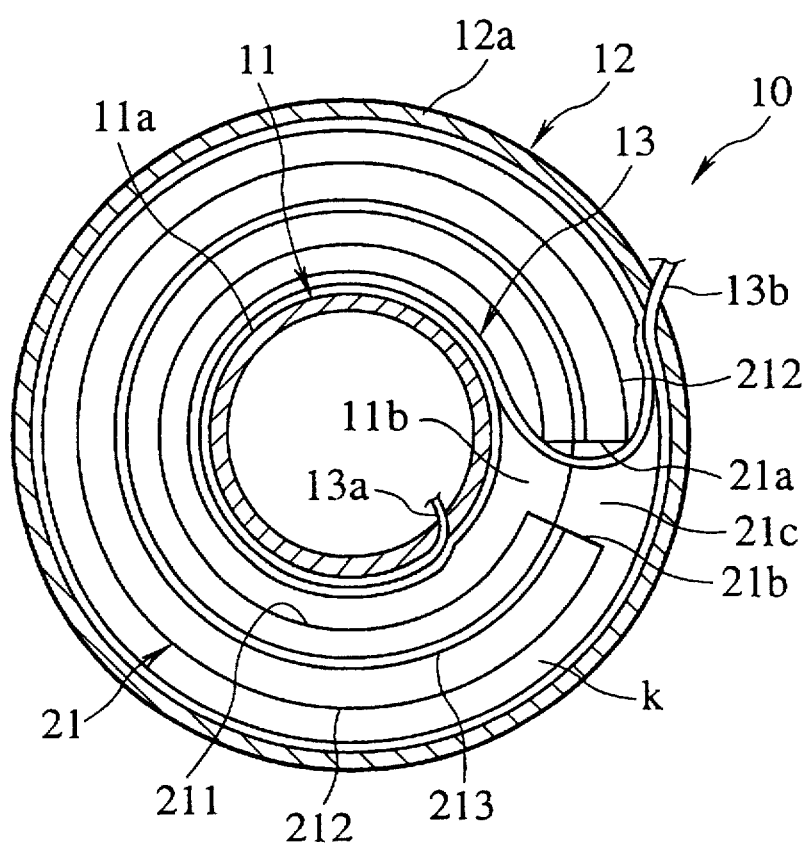
FIG. 1 is a partial cross sectional view of a relay device between rotating members, in accordance with a first embodiment of the present invention.
Figure 2:
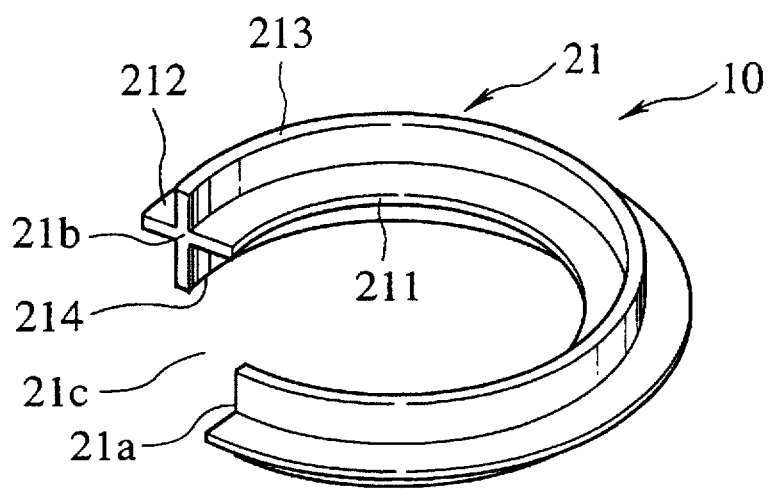
FIG. 2 is a perspective view of a moving member in the relay device of FIG. 1.

As shown in FIGS. 1 and 2, the moving member 21 has an inner horizontal rib 211 in the form of a plate, which projects from the inner peripheral face horizontally, and an outer horizontal rib 212 in the form of a plate, which also projects from the outer peripheral face horizontally. Thus, these horizontal ribs 211, 212 are formed so as to be in "linear" contact with the flat cable 13 along its movable direction. Further, the moving member 21 has an upper vertical rib 212 in the form of a plate, which projects upwardly and vertically to abut on the top cover 14 (see FIG. 3), and a lower vertical 214 in the form of a plate, which also projects downwardly and vertically to thereby abut on the under cover 12b. Consequently, the moving member 21 has a cross-shaped section consisting of the inner horizontal rib 211, the outer horizontal rib 212, the upper vertical rib 213 and the lower vertical rib 214. Note, the moving member 21 is integrally molded of a lubricating material, such as Teflon (trademark), fluorinated polymer or the like.

In the embodiment and as shown in FIG. 3, the rotor 11 further includes an annular flange 11b projecting horizontally from approximately the middle height of an outer peripheral face of the rotor 11. When the C-shaped moving member 21 and the rotor 11 are assembled, the annular flange 11b supports the moving member 21 along the inner horizontal rib 211 while the lower vertical rib 214 of the moving member 21 surrounds the annular flange 11b of the rotor 11.

For example, the rotor 11 is connected to an element on the side of a steering wheel for a vehicle, while the stator 12 is fixed to another element on the side of a steering column of the vehicle.

In the relay device 10 constructed as above, when the inner cylinder 11a rotates in the counter-clockwise direction of FIG. 1 with respect to the outer cylinder 12a, the cable 13 is moved so as to wind round the inner cylinder 11a. Then, the cable 13 (part) on the outside of the moving member 21 firstly abuts on the outer horizontal rib 212 and thereafter, it abuts on an opening end 21a of the gap 21c. Next, the cable 13 enters into the inside of the moving member 21 while turning over in a U-shaped manner and finally, it winds round the inner cylinder 11a. During such a movement of the cable 13, the moving member 21 rotates in the counter-clockwise direction since the opening end 21a is urged by the cable 13.

Conversely, when the inner cylinder 11a rotates in the clockwise direction of FIG. 1 with respect to the outer cylinder 12a, the cable 13 is rewound so as to spread round the inner cylinder 11a. Thus, the cable 13 firstly abuts on the inner horizontal rib 211 of the moving member 21 and thereafter, it abuts on another opening end 21b of the gap 21c. Next, the cable 13 moves to the outside of the moving member 21 while turning over in a U-shaped manner and finally, it comes into contact with the inner peripheral face of the outer cylinder 12a. During this movement of the cable 13, the moving member 21 rotates in the clockwise direction since the opening end 21b is urged by the cable 13.

Therefore, according to the embodiment, since the inner and outer horizontal ribs 211, 212 are constituted by plate materials projecting from the moving member 21 horizontally, the contact area of the member 21 with the cable 13 can be reduced remarkably. In other words, since it is possible to reduce the frictional force of the moving member 21 applied on the cable 13, such a reduction allows the cable 13 to be displaced from the inside (or outside) of the moving member 21 to the outside (or inside) smoothly, so that it is possible to prevent the cable 13 from buckling.

In addition, since the moving member 21 is provided with the plate-shaped upper vertical rib 213 abutting on the top cover 14 and the plate-shaped lower vertical rib 214 abutting on the under cover 12b, the respective contact areas between the moving member 21 and the covers 14, 12b can be reduced. Thus, due to reduction in frictional force between the moving member 21 and the covers 14, 12b, it make the moving member 21 possible to move in the space K smoothly. Accordingly, since the movement of the cable 13 also smoothes, it is possible to prevent the cable 13 from buckling. Furthermore, since the moving member 21 comes in contact with the upper and under covers 14, 12b, it is possible to prevent the occurrence of rattling and noise of the member 21 caused by the vibrations in the upward and downward directions.

Again, the moving member 21 has a cross-shaped section composed of the ribs 211, 212, 213, 214, the frictional forces between the member 21 and the cable 13 and between the member 21 and the cable 13 can be reduced simultaneously.

Figure 4:
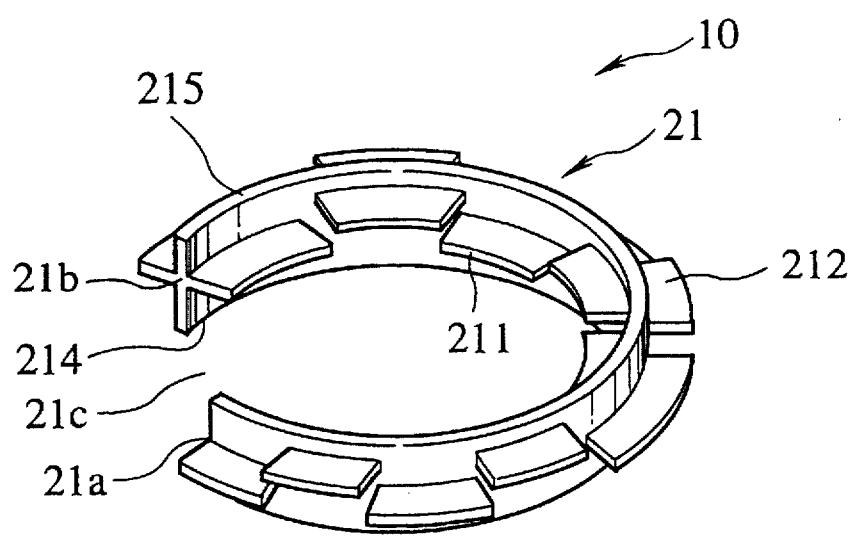
FIG. 4 is a perspective view of the moving member in the relay device in accordance with a second embodiment of the present invention.

We now describe the second embodiment of the present invention with reference to FIG. 4. It is noted that a feature of the second embodiment different from that of the first embodiment resides in that the inner and outer vertical ribs 211, 212 of the member 21 are shifted in the upward and downward directions. Since the structure of the embodiment is similar to the structures shown in FIGS. 1 and 3 except for the moving member 21, the similar descriptions will be deleted.

In the embodiment, as shown in FIG. 4, both of the inner horizontal rib 211 and the outer horizontal rib 212 are constituted by rib elements which are arranged along the circumferential direction of the moving member 21 and which are shifted from each other up and down. Each rib element has a predetermined length.

In the so-constructed relay device 10, when the cable 13 is in contact with the inner horizontal rib 211 or the outer horizontal rib 212, it is possible to maintain the cable 13 parallel to the inner or outer peripheral face of the moving member 21 usually. That is, since the cable 13 is not inclined to either peripheral face of the moving member 21, the movement of the cable 13 can be further facilitated.

Figure 5:
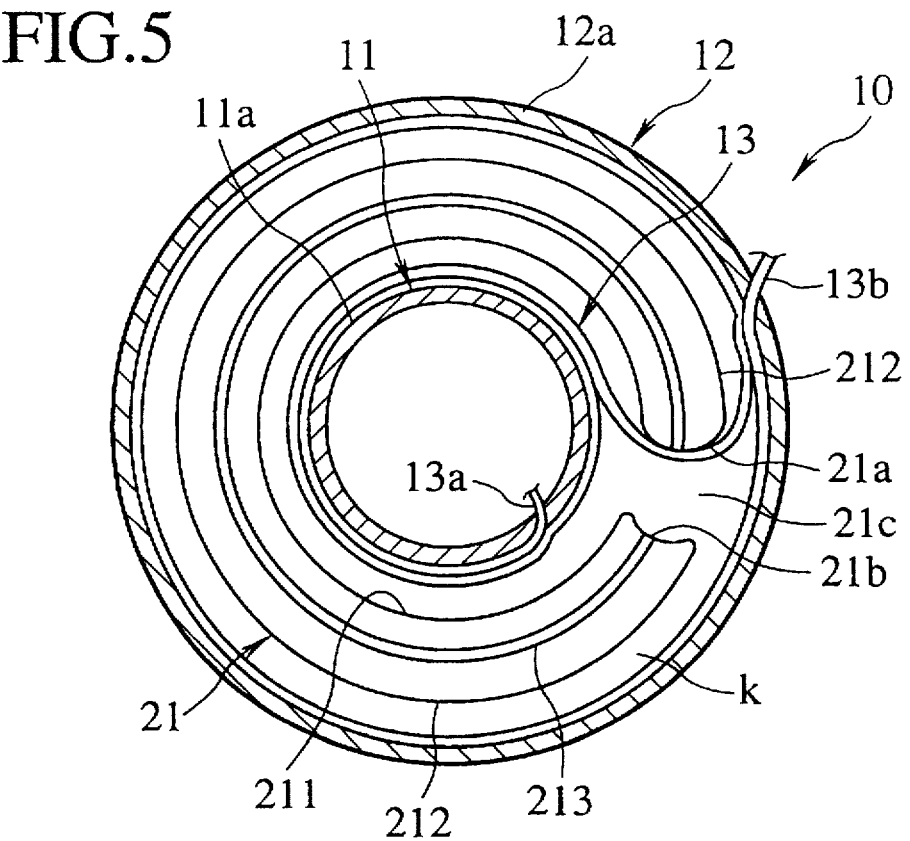
FIG. 5 is a partial cross sectional view of a relay device between rotating members, in accordance with a third embodiment of the present invention.
Figure 6:
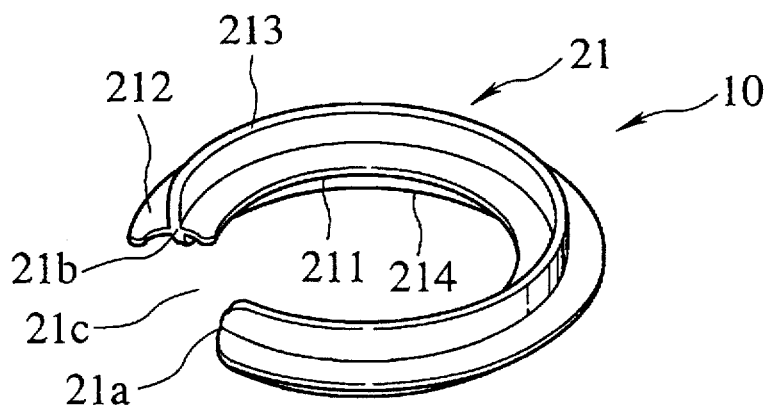
FIG. 6 is a perspective view of the moving member in the relay device of FIG. 5.

Next, we describe the third embodiment of the present invention with reference to FIGS. 5 and 6. Note, elements in common with the elements in the first embodiment of FIGS. 1 to 3 are indicated with the same reference numerals respectively, and their descriptions are deleted. The difference between the third embodiment and the first embodiment is that the moving member 21 is provided with the opening end 21a formed to project in an arc and the opening end 21b concavely formed in an arc.

In other words, the opening end 21a is convexly formed so as to follow the cable 13 turning over in an U-shape. While, the opening end 21b is concavely formed so as to follow a projecting top of the cable 13 turning over in an U-shape.

In the relay device 10 mentioned above, since the contours of the opening ends 21a, 21b are in accord with the configuration of the cable 13 turning over, it enables the cable 13 to move along the opening ends 21a, 21b smoothly. Therefore, it is possible to prevent the cable 13 from buckling.

Figure 7:
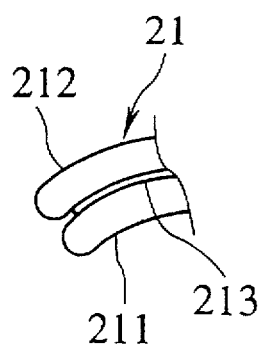
FIG. 7 is a plan view of an essential part of the moving member of the relay device of FIG. 5.

In the modification, as shown in FIG. 7, the opening end 21b may be constituted by the inner horizontal rib 211 and the outer horizontal rib 212 both of which are formed so as to project in the form of circular plates respectively, providing a concave boundary between the inner horizontal rib 211 and the outer horizontal rib 212.

Figure 8:
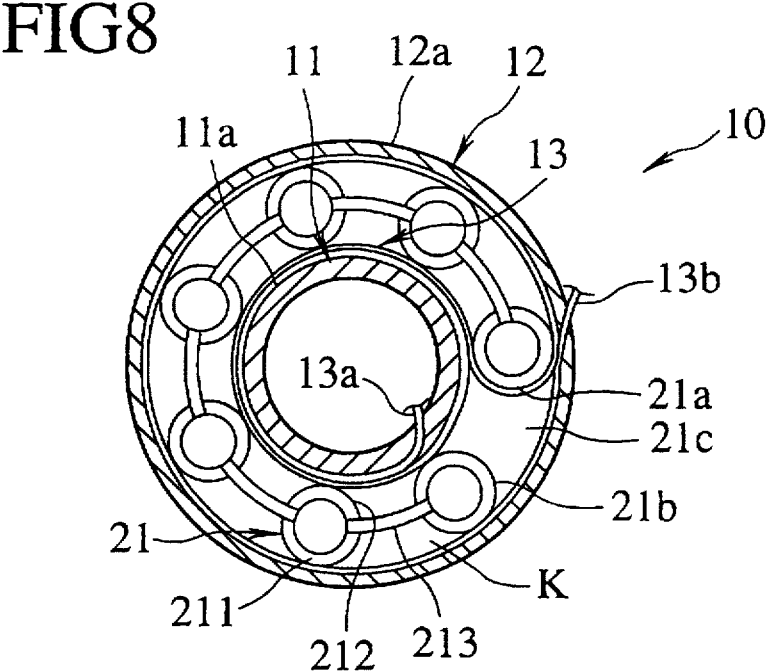
FIG. 8 is a partial cross sectional view of the relay device in accordance with a fourth embodiment of the present invention.
Figure 9:
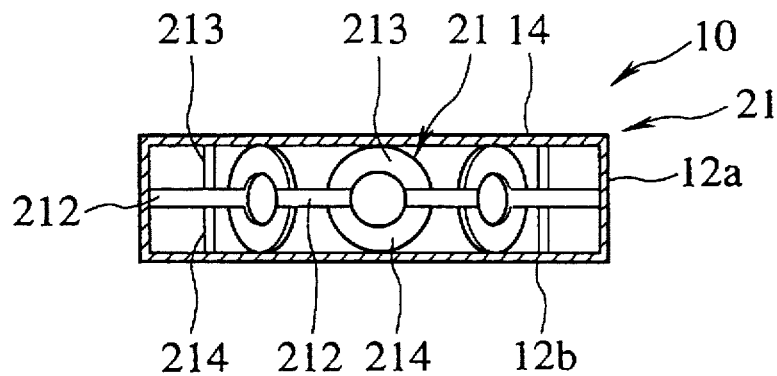
FIG. 9 is a lateral cross sectional view of the relay device of FIG. 8.
Figure 10:
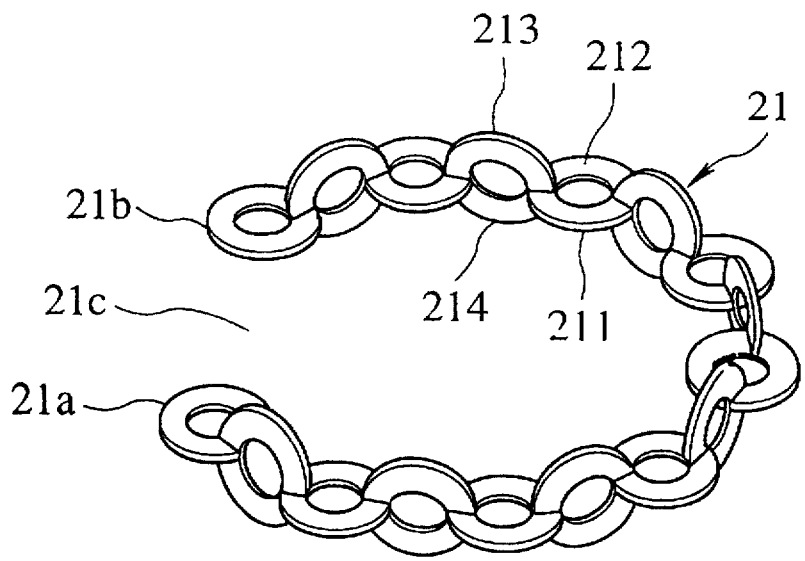
FIG. 10 is a perspective view of the moving member of the relay device of FIG. 8.

The fourth embodiment will be described with reference to FIGS. 8 to 10. Similarly, elements in common with the elements in the first embodiment of FIGS. 1 to 3 are indicated with the same reference numerals respectively, and their descriptions are deleted. The fourth embodiment is characterized in that all of the horizontal and vertical ribs 211, 212, 213 and 214 are composed of annular members respectively.

Thus, the inner horizontal rib 211 and the outer horizontal rib 212 are constituted by a plurality of members projecting in arcs, horizontally. While, the upper vertical rib 213 and the lower vertical rib 214 are constituted by a plurality of members projecting upward and downward in arcs. The inner horizontal rib 211 is adapted so as to abut the cable 13 against the inner cylinder 11a by appropriate elastic force. Also, the outer horizontal rib 212 is adapted so as to abut the cable 13 against the outer cylinder 12a by appropriate elastic force. Further, the upper and lower vertical ribs 213, 214 are adapted so as to abut on the top cover 14 and the under cover 12b by appropriate elastic force, respectively.

In the so-constructed relay device 10, since both of the inner horizontal rib 211 and the outer horizontal rib 212 are formed in arcs, it is possible to deform them elastically by appropriate forces. Accordingly, the inner and outer horizontal ribs 211, 212 allow the cable 13 to be urged against the inner and outer cylinders 11a, 12a, respectively, by appropriate elastic forces and to be supported thereon. Thus, it is possible to prevent the cable 13 from fluttering and buckling. Moreover, as the cable 13 abuts on the respective arcs at the tops, the contact area between the moving member 21 and the cable 13 can be decreased, thereby lightening the dynamic resistance of the cable 13 while reducing the sliding noise generated between the moving member 21 and the cable 13. Further, since the space between the inner cylinder 11a and the outer cylinder 12a is increased because of the reduction in area of the horizontal ribs 211, 212, the moving member 21 is so lightened that the dynamic resistance can be further decreased conveniently.

Figure 11:
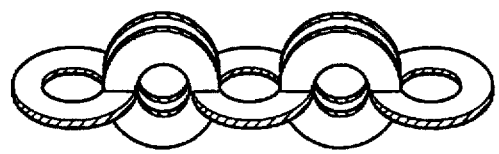
FIG. 11 is a perspective view of an essential part of the moving member in a modification of FIG. 10.
Figure 12:
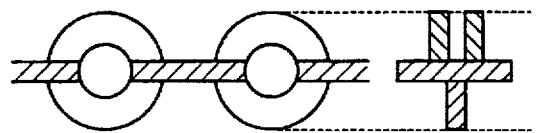
FIG. 12 is a view showing an example different from the moving member of FIG. 11.

Similarly, the upper and lower vertical ribs 213, 214 abut on the covers 14, 12b with proper elastic forces, respectively. Therefore, it is possible to restrict the frictional forces between the moving member 21 and the covers 14, 12b to a minimum and prevent the cable 13 from fluttering certainly. Moreover, it is also possible to reduce the sliding noise generated between the moving member 21 and the covers 14, 12b. Further, since the space between the top cover 14 and the under cover 12b is increased because of the reduction in area of the vertical ribs 213, 214, the moving member 21 is so lightened that the dynamic resistance can be further decreased, too. In the modification, as shown in FIG. 11, each of the upper and lower vertical ribs 213, 214 may be constituted by a combination of two parallel members projecting in an arc. Such a modification is also applicable to the horizontal ribs 211, 212. In addition, as shown in FIG. 12, the modification may be applied only to the upper vertical rib 213 or the lower vertical rib 214.

Figure 13:
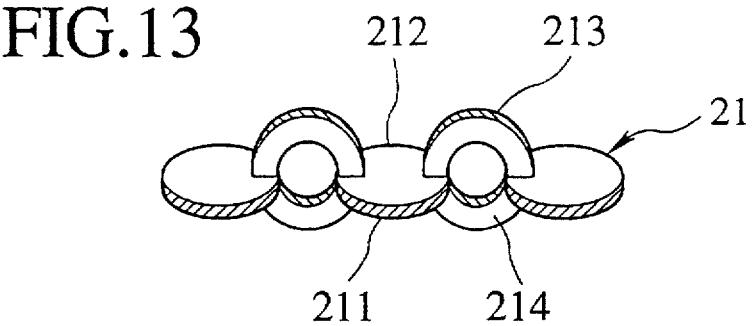
FIG. 13 is a perspective view of an essential part of the moving member, showing an example different from the moving member of FIG. 12.

Alternatively, the inner horizontal rib 211 and the outer horizontal rib 212 may be composed of a plurality of circular discs, as shown in FIG. 13. Also in this case, since the contact area between the moving member 21 and the cable 13 is so decreased as to reduce the dynamic resistance of the cable 13, it is possible to prevent the cable 13 from buckling and to reduce the sliding noise.

Figure 14:
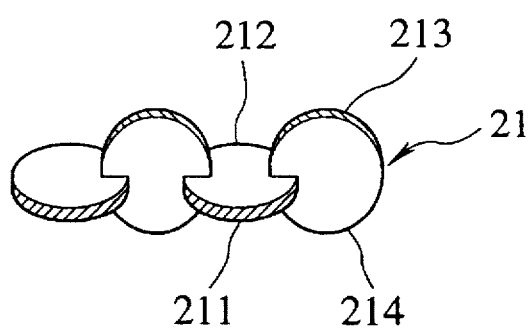
FIG. 14 is a perspective view of an essential part of the moving member, showing an example different from the moving member of FIG. 13.

In addition, the upper vertical rib 213 and the lower vertical rib 214 may be composed of a plurality of circular discs, as shown in FIG. 14. Also in this case, since the contact area between the moving member 21 and the covers 14, 12b is so decreased as to reduce the dynamic resistance of the cable 13, it is possible to prevent the cable 13 from buckling and to reduce the sliding noise.

Figure 15:
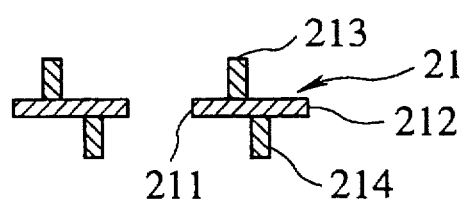
FIG. 15 is a cross sectional view of the moving members, showing an example different from the moving member of FIG. 14.

As shown in FIG. 15, the upper vertical rib 213 and the lower vertical rib 214 may be shifted to each other to left and right in the drawing. Consequently, the arrangement allows both of the ribs 213, 214 to be deformable elastically. Of course, the inner and outer horizontal ribs 211, 212 may be arranged to deviate from each other up and down.

Figure 16:
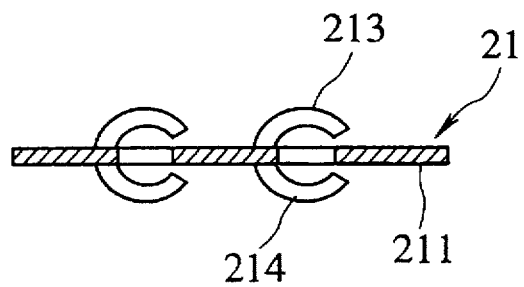
FIG. 16 is a side view of an essential part of the moving member, showing an example different from the moving member of FIG. 15.

Additionally, as shown in FIG. 16, each of the vertical ribs 213, 214 may be formed to project in an arc, provided with a notched base. Alternatively, the inner and outer horizontal ribs 211, 212 may be formed in such a way.

Figure 17:
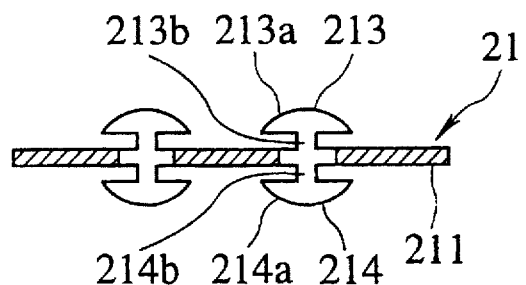
FIG. 17 is a side view of an essential part of the moving member, showing an example different from the moving member of FIG. 16.

In variation, as shown in FIG. 17, the upper vertical rib 213 and the lower vertical rib 214 may be composed of arc-shaped umbrella parts 213a, 214a and central axle parts 213b, 214b, respectively. Of course, the inner and outer horizontal ribs 211, 212 may be composed in such a manner.

The fifth embodiment will be described with reference to FIGS. 18 and 19. The difference between the fifth embodiment and the first embodiment of FIGS. 1 to 3 resides in that the inner and outer horizontal ribs 211, 212 of the moving member 21 are provided with elastic deformable members 211a, 212a, respectively. Besides the moving member 21, the structure of the relay device 10 of the embodiment is similar to that of FIGS. 1 and 3.

Figure 18:
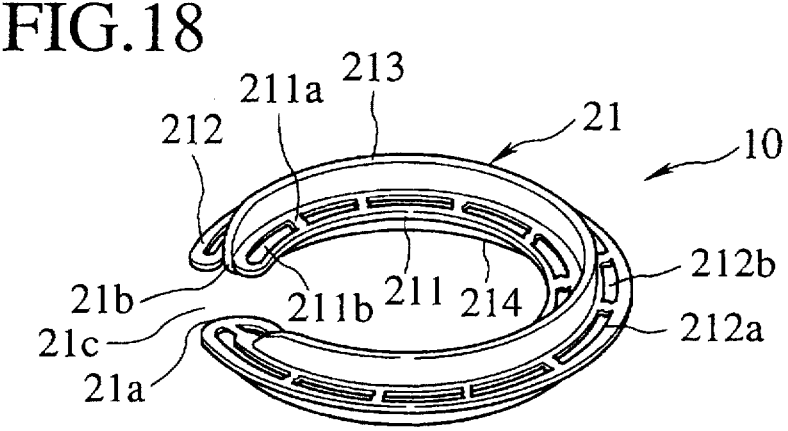
FIG. 18 is a perspective view of the moving member in the relay device in accordance with a fifth embodiment of the present invention.
Figure 19:
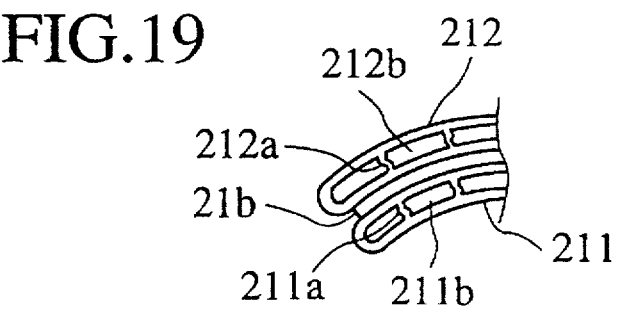
FIG. 19 is a plan view of an essential part of the moving member of FIG. 18.

In detail, as shown in FIGS. 18 and 19, the inner and outer horizontal ribs 211, 212 have grooves 211b, 212b formed at respective centers of widths, respectively. The elastic deformable members 211a, 212a are arranged so as to connect the grooves 211b, 212b to each other at intervals, respectively. The opening end 21a is formed so as to project in an arc, while the concave opening end 21b is provided by projecting respective ends of the inner and outer horizontal ribs 211, 212 in arcs.

Similarly to the fourth embodiment, the inner horizontal rib 211 is adapted so as to urge the cable 13 against the inner cylinder 11a with appropriate elastic force, while the outer horizontal rib 212 is adapted so as to urge the cable 13 against the outer cylinder 12a with appropriate elastic force, too.

In the above-constructed relay device 10, owing to proper deformation of the elastic deformable members 211a, 212a, the inner and outer horizontal ribs 211, 212 enable the cable 13 to be urged against the inner and outer cylinders 11a, 12a with appropriate forces and to be held thereon. Therefore, it is possible to prevent the cable 13 from fluttering and buckling.

Figure 20:
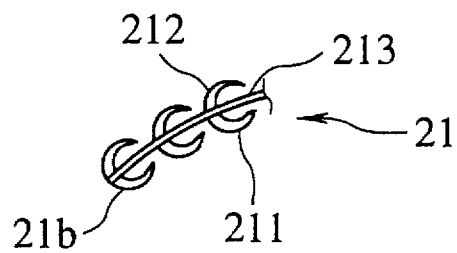
FIG. 20 is a plan view of an essential part of the moving member in a modification of FIG. 18.
Figure 21:
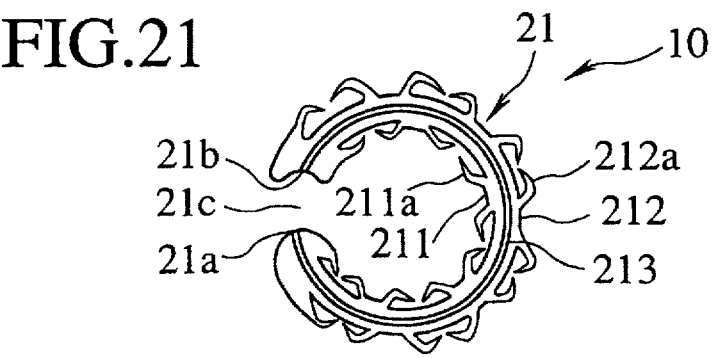
FIG. 21 is a plan view of the moving member, showing an example different from the moving member of FIG. 20.

Note, as shown in FIG. 20, the elastic deformable members 211a, 212a may be constituted so as to provide the inner and outer horizontal ribs 211, 212 projecting in C-shaped manner.

Alternatively, the elastic deformable members 211a, 212a may be so formed as to project from the inner and outer horizontal ribs 211, 212 in substantial V-shaped manner.

Figure 22:
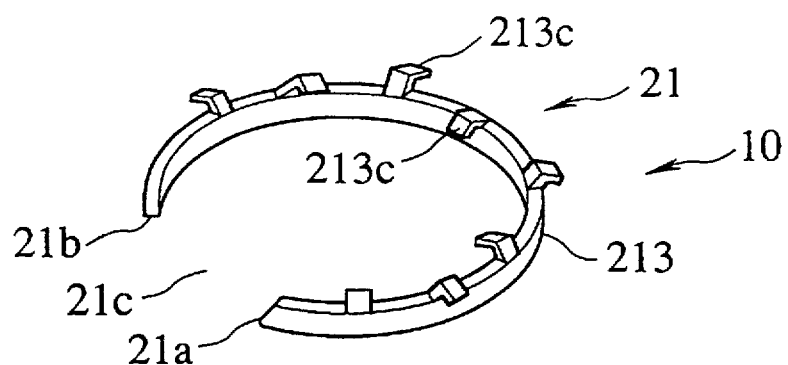
FIG. 22 is a perspective view of the moving member in the relay device in accordance with a sixth embodiment of the present invention.

Next, the sixth embodiment of the invention will be described with reference to FIG. 22. Different from the first embodiment of FIGS. 1 to 3, the sixth embodiment is characterized by the upper vertical rib 213 provided with elastic deformable members 213c. Besides the upper vertical rib 213 of the moving member 21, the relay device 10 of the embodiment is similar to that of FIGS. 1 to 3.

According to the embodiment, the upper vertical rib 213 is provided with the plural elastic deformable members 213c which abut on the top cover 14 elastically along the circumference of the rib 213. The elastic deformable members 213c are formed so as to rise from a top end of the rib 213 and sequentially project inward and outward by turns, providing V-shaped configuration.

In the so-constructed relay device 10, since the respective tops of the V-shaped members 213c come into contact with the top cover 14, it is possible to reduce the frictional force between the moving member 21 and the top cover 14 to a minimum and to prevent the moving member 21 from fluttering certainly.

Figure 23:
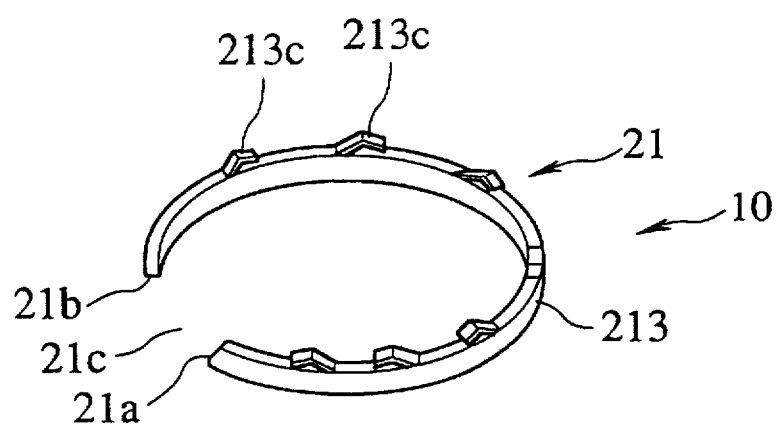
FIG. 23 is a perspective view of the moving member in a modification of FIG. 22.

In the modification, the elastic deformable member 213c may be formed on the lower vertical rib 214 solely, otherwise it may be formed on both of the upper vertical rib 213 and the lower vertical rib 214. In connection, as shown in FIG. 23, the elastic deformable member 213c may be formed so as not to project the inside and outside of the rib 213.

Finally, it will be understood by those skilled in the art that the foregoing description is one of preferred embodiments of the disclosed relay device, and that various changes and modifications may be made to the present invention without departing from the spirit and scope thereof.

What is claimed is:

1. A relay device comprising:
   a first rotor having an inner cylinder;
   a second rotor having an outer cylinder surrounding said inner cylinder of said first rotor at a designated distance, said outer cylinder rotating with respect to said inner cylinder relatively;
   a flexible flat cable wound spirally in an annular space defined between said inner cylinder and said outer cylinder, said flexible flat cable having an inner peripheral end carried by said inner cylinder and an outer peripheral end carried by said outer cylinder; and
   a C-shaped moving member arranged so as to move along said annual space, said C-shaped moving member having a gap where said flexible flat cable is turning over;
   a top cover for covering an upside of said annual space and an under cover for covering an underside of said annular space; and
   wherein said C-shaped moving member comprises an inner horizontal rib in the form of a plate projecting from an inner peripheral face of said C-shaped moving member horizontally, an outer horizontal rib in the form of a plate projecting from an outer peripheral face of said C-shaped moving member horizontally, and
   an upper vertical rib in the form of a plate projecting upwardly to abut on said top cover, and a lower vertical rib in the form of a plate projecting downwardly to abut on said under cover.

2. A relay device as claimed in claim 1, wherein said C-shaped moving member has a cross-shaped section composed of said inner horizontal rib, said outer horizontal rib, said upper vertical rib and said lower vertical rib.

3. A relay device as claimed in claim 1, wherein said inner horizontal rib and said outer horizontal rib are formed to have predetermined lengths respectively, and arranged so as to deviate from each other up and down.

4. A relay device as claimed in claim 1, wherein said inner horizontal rib and said outer horizontal rib are composed of a plurality of members projecting in the form of circular plates.

5. A relay device as claimed in claim 1, wherein said upper vertical rib and said lower vertical rib are composed of a plurality of members projecting in the form of circular plates.

6. A relay device as claimed in claim 1, wherein said inner horizontal rib and said outer horizontal rib are composed of a plurality of members projecting in arcs.

7. A relay device as claimed in claim 1, wherein said upper vertical rib and said lower vertical rib are composed of a plurality of members projecting in arcs.

8. A relay device as claimed in claim 1, wherein said inner horizontal rib and said outer horizontal rib have elastic deformable members, respectively.

9. A relay device as claimed in claim 1, wherein said upper vertical rib and said lower vertical rib have elastic deformable members, respectively.

* * * * *